May 28, 1968     L. H. MORIN     3,385,158
TWO-PART MOLDED BLIND RIVET
Filed July 27, 1966     2 Sheets-Sheet 1
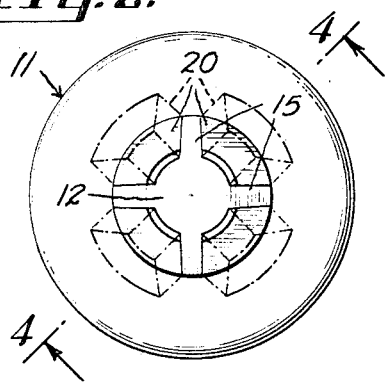
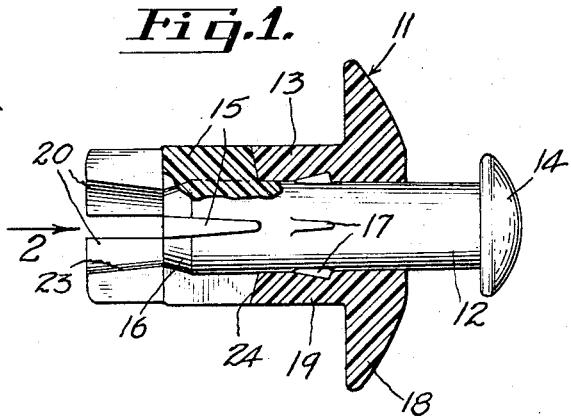
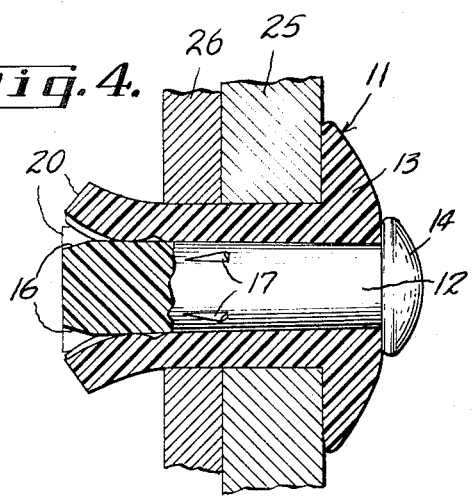
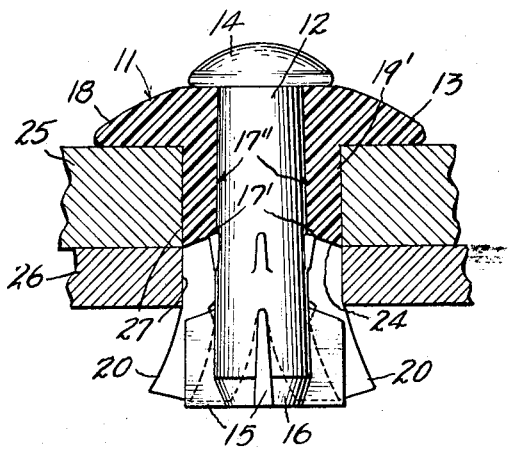
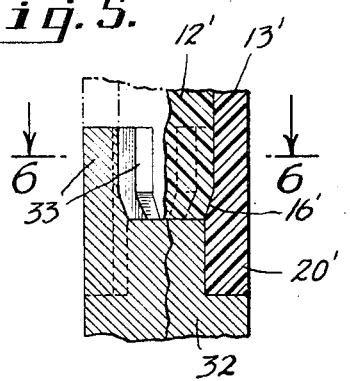
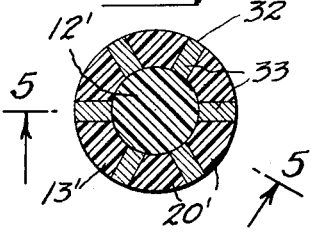
INVENTOR.
LOUIS H. MORIN
BY
*Howard T. Thompson*
ATTORNEY May 28, 1968 L. H. MORIN 3,385,158
TWO-PART MOLDED BLIND RIVET
Filed July 27, 1966 2 Sheets-Sheet 2
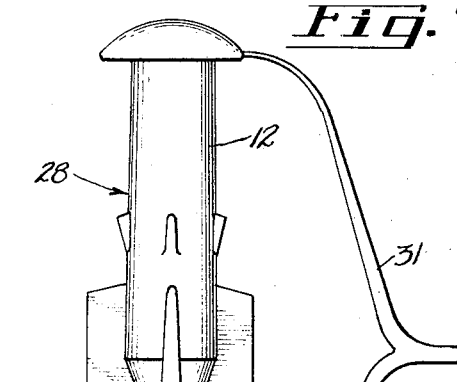
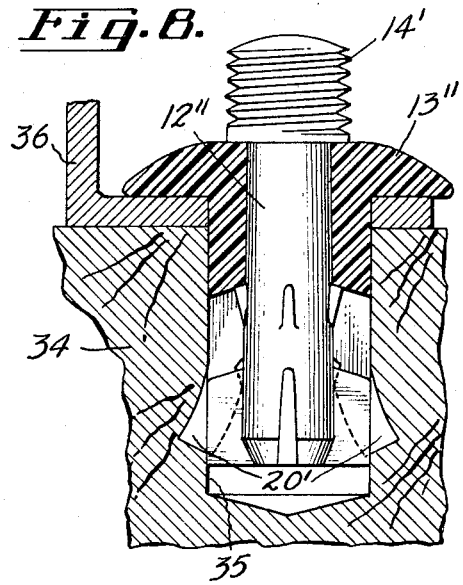
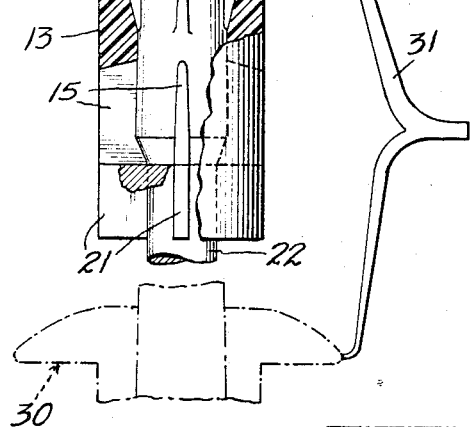
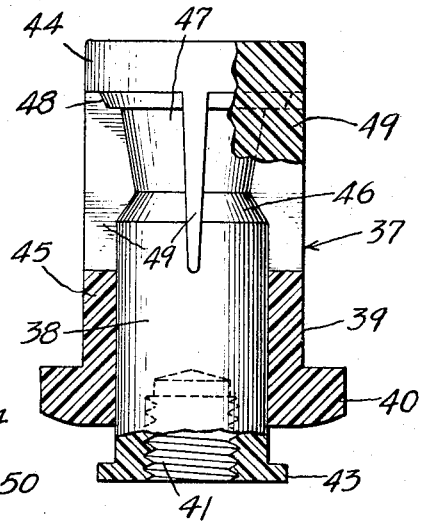
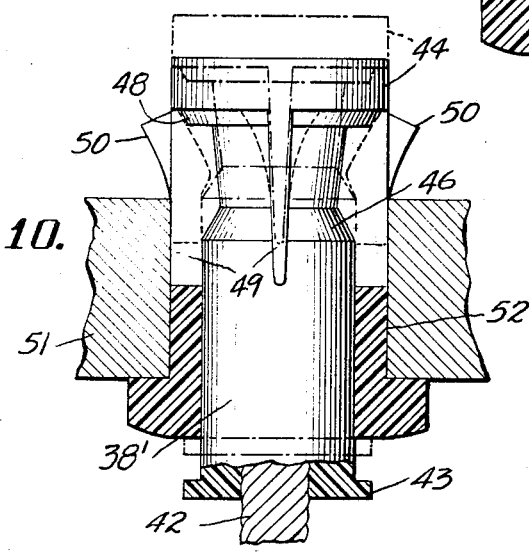
INVENTOR.
LOUIS H. MORIN
BY
Howard Thompson
ATTORNEY United States Patent Office 3,385,158
Patented May 28, 1968

3,385,158
TWO-PART MOLDED BLIND RIVET
Louis H. Morin, Bronx, N.Y., assignor to Coats & Clark Inc., New York, N.Y., a corporation of Delaware
Filed July 27, 1966, Ser. No. 568,316
3 Claims. (Cl. 85—77)

ABSTRACT OF THE DISCLOSURE

A blind rivet comprising a pin and sleeve part, the former having locking lugs which engage in slots separating the locking elements at one end of the sleeve part.

---

This invention relates to the production of what are generally referred to as blind rivets comprising a pin part and a sleeve part molded directly upon the pin part, with the parts in predetermined relationship to each other and, wherein, movement of the pin part into operative position will automatically move portions of the sleeve part into locking position. More particularly, the invention deals with a rivet of the character described, wherein means is employed for retaining the parts against relative movement one with respect to the other when the parts are in operative position.

Still more particularly, the invention deals with a rivet structure of the character defined, wherein the pin part can include a secondary structure or element for special uses of the blind rivet.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a sectional view of a blind rivet made according to my invention, with the parts in the normal molded position, part of the structure being shown in elevation and part broken away.

FIG. 2 is a view generally looking in the direction of the arrow 2 of FIG. 1 and indicating, in dot-dash lines, the operative position of the rivet.

FIG. 3 is a view, generally similar to FIG. 1, showing the rivet in operative position in connection with two supports.

FIG. 4 is a view, similar to FIG. 3, but taken on the line 4—4 of FIG. 2, with a portion of the rivet part shown in section.

FIG. 5 is a sectional detail view illustrating a core utilized in the formation of a modified form of blind rivet, otherwise generally of the structure shown in FIGS. 1 to 4, inclusive, the section of FIG. 5 being on the broken line 5—5 of FIG. 6.

FIG. 6 is a section on the line 6—6 of FIG. 5.

FIG. 7 is a diagrammatic view to illustrate the method of forming the molded parts of the blind rivet, as shown in FIGS. 1 to 4, inclusive.

FIG. 8 is a diagrammatic sectional view showing a rivet generally of the structure shown in FIG. 3 and illustrating a modified form of pin part.

FIG. 9 is a view, generally similar to the showing in FIG. 1, of a modified form of blind rivet, with parts of the construction broken away and in section; and FIG. 10 is a view diagrammatically illustrating the use of the rivet shown in FIG. 9, wherein the full line showing illustrates the final locked position of the rivet and, further, the dot-dash showing illustrates movement of the pin part in laterally spreading portions of the sleeve part.

Considering FIGS. 1 to 4, inclusive, and FIG. 7, the blind rivet assemblage is generally identified by the reference character 11, the rivet comprising a stud or pin part 12 and a shell or sleeve part 13.

The part 12 has a head 14 at one end, four radially and projecting and tapered ribs 15 at the opposed end portion, said end portion including a bevelled end 16. The part 12 also includes on the shank thereof and in alinement with the ribs 15 four bevelled and tapered lock lugs. 17.

In forming the assemblage 11, the part 13 is molded on the pre-formed part 12, in accordance with a method later described. The part 13 has an enlarged flange-type head 18 at one end and the sleeve portion 19 terminates at its inner end in four lock elements 20 partially formed by the ribs 15 and the bevelled end 16, as well as by ribs or fins 21 of a core 22, note FIG. 7 or a core generally similar to the core 22, the primary difference being that the core used in forming the assemblage, as seen in FIG. 1, will produce a taper on the inner surfaces of the elements 20, as seen at 23 in FIG. 1 of the drawing.

Considering FIG. 4 of the drawing, the wall structure of the sleeve 19 is continuous with the elements 20; whereas, the slots or recesses formed by the ribs 15 and the ribs or fins 21 of the core terminate the sleeve 19, as indicated at 24 in FIG. 1 of the drawing.

In the use of the assemblage 11 in securing two or more members as, for example, the members 25 and 26 together, the assemblage is first placed in a pre-formed hole or aperture 27 in the members 25 and 26, after which, the pin part 12 is driven home, in which operation, the bevelled end 16 of the pin part 12 flares the elements 20 laterally, as diagrammatically seen in FIGS. 3 and 4 of the drawing, thus attaining the assemblage in secure position on the members 25 and 26.

Considering FIG. 1 of the drawing, it will appear that the lock lugs 17 are molded within the bore of the sleeve 19. However, with many types of plastic materials, in the driving operation of the pin part 12, these lock lugs will flex the sleeve, permitting movement of the pin part 12 to the position shown in FIGS. 3 an 4; wherein the ends 17' of the lock lugs will engage the ends 24 of the slots, as clearly seen in FIG. 3 of the drawing, thus retaining the assembled parts in the operative position against accidental displacement.

While it is possible and, in fact, likely that recesses would prevail in the bore 19' of the sleeve 19 as, for example, in the area 17", FIG. 3, in other words, the recesses left by formation of the lugs 17, a showing of these recesses has been omitted for sake of clarity in the illustration. In forming the parts 12 and 13 of metal, the lugs 17 would not be employed.

Turning now to the diagrammatic showing in FIG. 7 of the drawing, here the three primary stations of a molding operation are shown without illustration of the dies, as the die structure will be well-known to one skilled in the art.

The station 28 will represent the cavity station for forming the pin part 12, while station 29 will include the cavity in the same die for forming the sleeve part 13 and at 30 I have indicated, in part in dot-dash lines, the trimming station, from which the final assemblage 11 would be discharged from the molding machine, after removing the branch gate 31 in a trimming operation occurring at the station 30. Suitable means will be provided, as known in the art, for moving the pin part 12 to position in the cavity at station 29, as well as for shifting the molded assemblage 11 from the station 29 to the trimming station 30. It is pointed out, at this time, that the core 22 is moved into and out of position with the cavity at station 29 in formation of the sleeve part 13, the ribs or fins 21 on the core 22 being in alinement with the ribs 15 on the pin part 12, as noted in FIG. 7. The core 22 is moved out of the path of movement of the assemblage 11 in movement of the assemblage from the station 29 to the station 30. From the structure of the branch gate 31, it is quite apparent that, in each molding operation of the machine, one pin part 12 and one sleeve part 13 are simultaneously formed, the latter being formed on a pin part 12 then positioned at station 29.

Considering FIGS. 5 and 6 of the drawing, 12' would represent the lower portion of a pin part, similar to the part 12, with the exception that the ribs 15 would not be employed. However, a tapered lower end 16' would be at the lower end of the part 12'. Substituted for the core 22 is a core 32 having a plurality of ribs or fins 33, six of which are employed in the construction shown. Any odd number of ribs can be employed and, with the six ribs, six lock elements 20' will be formed on the inner end of the sleeve 13' rather than four, as disclosed in FIGS. 1 to 4, inclusive. Otherwise, the resulting structure of the assemblage would be the same as that of the assemblage 11 shown in FIGS. 1 to 3 inclusive.

In FIG. 8 of the drawing, I have shown at 13" a sleeve part, generally similar to the sleeve part shown in FIGS. 1 to 3, inclusive. However, with this structure, the pin part 12" differs from the pin part 12 in employing a threaded stud head end 14', instead of the head 14 shown in FIG. 1. This facilitates the attachment of a device or member of any type or kind with the rivet. In FIG. 8, the rivet assemblage is shown mounted in any type of a wooden support 34 which has been drilled to form a hole or socket 35 to receive the assemblage. With this structure, the lock elements 20' will be forced into the support 34, as diagrammatically seen. The assemblage can be utilized in securing a metal angle iron or the like 36 to the support 34.

Turning now to the showing in FIGS. 9 and 10, here a different form of rivet assemblage 37 is shown, wherein the stud or pin part 38 differs from the pin part shown in the other figures; whereas, the sleeve part 45 is generally of the same structural characteristics as the showing in FIGS. 1 to 4, inclusive, the head 40 of the sleeve part differing in shape and contour. While the stud or pin part 38', FIG. 10, differs slightly from the part 38 of FIG. 9, the structures of these parts as described for example in connection with the pin 38 will apply to both parts. In FIG. 9, one end of the part 38 has a threaded bore 41, either formed in the molding operation or by using a core for this purpose, or by threading after the assemblage has been molded.

In FIG. 10, I have shown at 42 a cable, upon which the pin part 38' has been molded for anchorage of the cable in said pin part. The end portion of the pin part includes an annular flange or head 43. The other end portion of the pin part has a supplemental head 44, equal in diameter to the outside diameter of the sleeve portion 45 of the sleeve part 37.

The pin part 38 has an annular bevelled surface 46, from which extends a conical portion 47 and between 47 and the head 44 the inner end of the head has an annular tapered shoulder 48. In referring to 46 and 48 as annular, they are annular, except for the interruption of four ribs 49, generally similar to the ribs 15, with the exception that the ribs extend to the head 44. It will, thus, be apparent that, when the sleeve part 37 is molded upon the pin part 38 in the manner previously described, the ribs 49 will form four lock elements 50, two of which are seen in extended locked position in FIG. 10 of the drawing, these elements again being generally similar to the elements 20 of FIGS. 1 to 4, inclusive.

In driving the pin part 12 from the position of FIG. 1 to the position of FIG. 3, it is understood that the bevelled surface 16 serves to force the lock elements 20 into the laterally extended operative position shown and, in like manner, with the structures of FIGS. 9 and 10, the bevelled surface 46 serves to accomplish the same result in moving the lock elements 50 into the position shown in FIG. 10.

Considering FIG. 10, it will be apparent that this operation is performed by moving the pin part from the full line position, shown in FIG. 10, to the dot-dash position of said figure. However, in order to retain the lock elements 50 in the operative position, a secondary operation is preferably performed, namely to then move the pin part 38, 38' from the dot-dash position, as indicated in FIG. 10, back to the full line position of said figure, which brings the elements 50 into engagement with the taper 48 and the ends of the elements 50 under the head 44, as clearly seen in FIG. 10, definitely preventing the pin 38' from being pulled out beyond the position shown in full lines in FIG. 10.

With the structures shown in FIGS. 9 and 10, the support, in connection with which the assemblage is mounted such, for example, as the support 51, could be a wall having a hole 52 therein for reception of the assemblage or a sheet of metal, wood, fibre or any other material. Keeping in mind the threaded bore 41 of FIG. 9, this would adapt the assemblage for attachment of any type of device or the like with the blind rivet.

Having fully described my invenuion, what I claim as new and desire to secure by Letters Patent is:

1. A blind rivet assemblage comprising a pin part and a sleeve part molded upon the pin part in forming the assemblage, the pin part having a plurality of longitudinal circumferentially spaced ribs at one end portion for forming on the sleeve part a plurality of circumferentially spaced lock elements, said end portion of the pin part and said lock elements having interengaging beveled surfaces, an end portion of said sleeve part having a head, and said pin part being movable relatively to the sleeve part, in which operation the interengaging beveled surface of said parts facilitate lateral extension of the lock elements of the sleeve part in movement of the assemblage into a locked position in connection with a support, said pin part having intermediate the end portions thereof a plurality of circumferentially spaced lock lugs in longitudinal alignment with said ribs between said head end and said ribs and operatively engaging the sleeve part at the head end of the elongated space between said lock elements on said sleeve part.

2. A blind rivet assemblage comprising a pin part and a sleeve part molded upon the pin part in forming the assemblage, the pin part having a plurality of longitudinal circumferentially spaced ribs at one end portion for forming on the sleeve part a plurality of circumferentially spaced lock elements, said end portion of the pin part and said lock elements having interengaging beveled surfaces, an end portion of said sleeve part having a head, and said pin part being movable relatively to the sleeve part, in which operation the interengaging beveled surfaces of said parts facilitate lateral extension of the lock elements of the sleeve part in movement of the assemblage into a locked position in connection with a support, a plurality of circumferentially spaced lock lugs positioned on said pin part intermediate the end portion thereof spaced from said ribs in longitudinal alignment with said ribs and operatively engaging the sleeve part in retaining both parts of the assemblage in locked position, the space between the head ends of said lugs and the head ends of said ribs being substantially equal to the space said pin part moves in expanding said lock elements into their operative position so that said lugs move into the head ends of the spaces between said lock elements as originally formed by the said ribs during the molding operation.

3. A blind rivet assemblage comprising a pin part and a sleeve part molded upon the pin part in forming the assemblage, the pin part having a plurality of longitudinal circumferentially spaced ribs at one end portion for forming on the sleeve part a plurality of circumferentially spaced lock elements, said end portion of the pin part and said lock elements having interengaging beveled surfaces, an end portion of said sleeve part having an enlargement forming a head, and said pin part being movable relatively to the sleeve part, in which operation the interengaging beveled surfaces of said parts facilitate lateral extension of the lock elements of the sleeve part in movement of the assemblage into a locked position in connection with a support, the rib end portion of the pin part includes a head, said head having on its inner surface an inwardly set tapered annular shoulder, and said lock elements operatively engaging said shoulder and the inner surface of the pin head in retaining the assemblage against separation, as well as against accidental displacement from a support, in connection with which the assemblage is mounted, and said ribs extending longitudinally of said pin part from said inwardly set tapered annular shoulder on said pin head toward the opposite end of said pin part beyond said interengaging beveled surfaces.

References Cited

UNITED STATES PATENTS

| | | | |
|---|---|---|---|
| 688,756 | 12/1901 | Tripp | 85—75 |
| 1,912,795 | 6/1933 | Rice et al. | 85—66 |
| 2,344,717 | 3/1944 | Mills et al. | 85—82 |
| 2,542,144 | 2/1951 | Kearns | 85—72 |
| 2,555,420 | 6/1951 | Richardson | 85—85 |
| 2,997,910 | 8/1961 | Tinnerman | 85—77 |
| 3,116,528 | 1/1964 | Poe | 85—84 |
| 3,147,525 | 9/1964 | Texier | 85—77 |
| 3,188,905 | 6/1965 | Millet | 85—84 |
| 3,272,060 | 9/1966 | Morin | 85—77 |

FOREIGN PATENTS

| | | |
|---|---|---|
| 667,637 | 7/1963 | Canada. |
| 904,846 | 3/1945 | France. |

MARION PARSONS, JR., *Primary Examiner.*